United States Patent Office 3,438,958
Patented Apr. 15, 1969

3,438,958
METHOD OF POLYMERIZING BUTADIENE BY MEANS OF A REACTION PRODUCT OF ORGANOALUMINUM FLUORIDE, CERTAIN ORGANONICKEL COMPOUNDS AND BORON TRIFLUORIDE OR ITS STABLE COMPLEXES
Morford C. Throckmorton, Akron, Ohio, assignor to The Goodyear Tire & Rubber Company, Akron, Ohio, a corporation of Ohio
No Drawing. Filed Feb. 23, 1967, Ser. No. 617,847
Int. Cl. C08d 1/14, 3/08
U.S. Cl. 260—94.3     10 Claims

ABSTRACT OF THE DISCLOSURE

A method and a catalyst system for the solution polymerizing butadiene or butadiene in mixture with other diolefins to form polymers containing a high content of cis 1,4 addition is described. The solution polymerization is carried out within a preferred temperature range of from 30 to 90° C. The catalyst employed is a reaction product of (1) an organoaluminum fluoride, (2) organonickel compounds and (3) boron trifluoride or boron trifluoride complexes.

---

This invention is directed to methods of polymerizing butadiene or butadiene in mixture with other diolefins to form polymers having a high content of cis 1,4 polybutadiene. It is also directed to a catalyst system by which these polymerizations may be accomplished.

High cis 1,4 polybutadiene or copolymers of butadiene and other diolefins which contain high cis 1,4 polybutadiene are known to possess certain desirable properties as a useful rubber.

It is the object of this invention to provide a method whereby butadiene can be polymerized to a high content of cis 1,4 polybutadiene. Another object is to provide a catalyst system by which these polymerizations may be accomplished. Another object is to form copolymers of isoprene and butadiene in which the polybutadiene segment has a high content of cis 1,4 structure. Other objects will become apparent as the description proceeds.

According to the invention butadiene and/or mixtures of butadiene with other diolefins is polymerized by contact, under polymerization conditions, with a catalyst comprising (1) at least one organo aluminum fluoride, (2) at least one organo nickel compound, and (3) at least one material selected from the group consisting of boron trifluoride and stable complexes of boron trifluoride.

By the term "organo aluminum fluoride" is meant any organo aluminum compound corresponding to the formula

in which $R_1$ is selected from the group consisting of alkyl (including cycloalkyl), aryl, alkaryl, arylalkyl and hydrogen, and $R_2$ is selected from the group of alky (incuding cycoalkyl), aryl, alkaryl and arylalkyl and fluorine, and F is fluorine. Representative of such compounds are diethyl aluminum fluoride, diisobutyl aluminum fluoride, dioctyl aluminum fluoride, ethyl aluminum difluoride, isobutyl aluminum difluoride, ethyl fluoro aluminum hydride, hexyl fluoro aluminum hydride and the like.

The component of the catalyst of this invention which contains nickel may be any organo nickel compound. It is preferred to employ a soluble compound of nickel. These soluble nickel compounds are usually compounds of nickel with a mono- or bi-dentate organic ligand containing up to 20 carbon atoms. "Ligand" is defined as an ion or molecule bound to and considered bonded to a metal atom or ion. "Mono-dentate" means having one position through which covalent or coordinate bonds with the metal may be formed; "bi-dentate" means having two positions through which covalent or coordinate bonds with the metal may be formed. By the term "soluble" is meant soluble in inert solvents. Thus, any salt of an organic acid containing from about 1 to 20 carbon atoms may be employed. Representative of organo nickel compounds are nickel benzoate, nickel acetate, nickel naphthenate, bis(α-furyl dioxime) nickel, nickel octanoate, nickel palmitate, nickel stearate, nickel acetylacetonate, bis(salicylaldehyde) ethylene diimine nickel, nickel salicaldehyde and nickel tetracarbonyl. The preferred component containing nickel is a nickel salt of a carboxylic acid or an organic complex compound of nickel.

The third component of the catalyst is boron trifluoride or a stable complex of boron trifluoride. Of course, boron trifluoride is normally a gas. However, many of its complexes are liquids or solids and for that reason may be easier to process in the performance of the invention. They have also been found to perform differently in the process of the invention. The term "complexes of boron trifluoride" is meant to include the ester and ketone complexes of $BF_3$, representative examples of which are $BF_3$ complexes of ethyl benzoate, phenyl acetate, tricresyl phosphate, benzophenone, acetophenone and acetone; the nitrile complexes of $BF_3$, an example of which is the $BF_3$ complex with benzonitrile; the complexes of $BF_3$ with materials containing OH groups to form boron trifluoride alcoholates such as alcohols and phenols, representative of which are methanol, ethanol, butanol, phenol and cresol such as $BF_3 \cdot$ phenolate, $BF_3 \cdot$ ethanolate; the $BF_3$ complexes of acids and water such as phosphoric acid, mono-hydrate and dihydrate and the complexes of $BF_3$ with ethers to form $BF_3$ etherates, representative of which are diethyl ether, diisopropyl ether, di-n-propyl ether, dibutyl ether, dihexyl ether, anisole and ethyl phenyl ether and an example of which is $BF_3 \cdot O(C_2H_5)_2$.

The three catalyst components may be charged separately in either stepwise or simultaneous addition to the polymerization system, or they may be mixed with one another in an inert solvent and then the "preformed" catalyst added to the polymerization system.

This three-component catalyst system has a polymerization activity over a wide range of catalyst concentration and catalyst ratios. The three catalyst components inter-react to form the active catalyst. As a result, the optimum concentration for any one catalyst is very dependent upon the concentration of each of the other two catalyst components. While polymerization will occur over a wide range of catalyst concentrations and ratios, polymers having the most desirable properties are obtained over a more narrow range. Polymerization can occur while the mol ratio of the organo aluminum fluoride (Al) to the mol ratio of boron trifluoride or boron trifluoride stable complexes (B) i.e. Al/B ranges from about 0.1/1 to about 5/1; the mol ratio of the organo aluminum fluoride (Al) to the organo nickel compound (Ni) i.e., Al/Ni ranges from about 0.4/1 to about 100/1 and the mol ratio of the boron trifluoride or boron trifluoride complex (B) to the organo nickel compound (Ni) i.e., B/Ni from about 1/1 to about 100/1. However, the more preferred mol ratios are Al/B about 0.4/1 to about 2/1, Al/Ni about 2/1 to about 60/1 and B/Ni about 2/1 to about 60/1.

The amount of catalyst, of course, varies depending upon a number of factors. Those skilled in the art can readily determine the proper concentrations. As can be observed from the examples, successful polymerization can be obtained with very low concentrations of catalyst which are expressed either as millimoles or as parts per hundred of monomer (p.h.m.).

In general, the polymerizations of this invention are carried out in any inert solvent and so are known as solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are aliphatic solvents such as hexane and benzene. The solvent/monomer volume ratio may be varied over a wide range. Up to 20 or more to 1 volume ratio of solvent to monomer can be employed. It is usually preferred to use a solvent/monomer volume ratio of about 3/1 to about 6/1.

It is usually desirable to conduct the polymerizations of this invention employing air-free and moisture-free techniques.

The temperature employed in the polymerization of this invention are not critical and may vary from a low temperature such as $-10°$ C. or below up to high temperatures such as $100°$ C. or higher. However, it is usually more desirable to employ a more convenient temperature between about $30°$ C. and about $90°$ C.

The practice of this invention is further illustrated by reference to the following examples which are intended to be representative rather than restrictive of the scope of this invention. Unless otherwise noted, all parts and percentages are by weight. Dilute solution viscosities (DSV), determined in toluene at $30°$ C., are used as a measure of polymer molecular weight.

Example 1

A purified butadiene-benzene premix containing 10 g. of butadiene per 100 cc. was charged to 4-ounce bottles. Nitrogen gas was flushed over the surface of the premix while the catalysts consisting of diethyl aluminum fluoride, nickel octanoate and boron trifluoride ethyl etherate were charged. The bottles were tumbled end-over-end in a constant temperature bath at $50°$ C. for 18 hours. At least one of each of the three classes of catalyst components must be present in order to polymerize butadiene to elastomers as shown by the following data:

| Exp. No. | Catalyst, millimoles/10 g. bd. | | | Yield, wt. g. | DSV |
|---|---|---|---|---|---|
| | DEAF | Ni octanoate | $BF_3 \cdot Et_2O$ | | |
| 1 | 0.1 | 0.005 | 0.075 | 9.2 | 1.97 |
| 2 | .1 | .005 | 0 | 0.0 | |
| 3 | .5 | .01 | 0 | 0.0 | |
| 4 | .0 | .005 | .075 | 0 | |
| 5 | .1 | .0 | .075 | 0 | |
| 6 | .1 | .005 | .075 | 9.9 | 2.28 |

Example 2

The results of the following experiments illustrate that the alkylaluminum florides are unique. The fluoride specie was the only alkylaluminum halide that, in combination with nickel and boron trifluoride ethyl ether complex, produced solid polymer during polymerization of butadiene. Furthermore, the fluorides are the only halides that permit formation of high (96 to 97%) cis 1,4 polybutadiene. The polymerizations were effected in a manner similar to that described in Example 1 except that various alkyl aluminum halides were employed which are listed in the table below and in experiments 1 through 5 the catalyst employed contained 0.06 millimole of aluminum alkyl fluoride (Al), 0.005 millimole of nickel octanoate (Ni), and 0.075 millimole of boron trifluoride diethyl ether complex (B) and experiments 6 through 9 contain 0.15 millimole of Al, 0.005 millimole of Ni, and 0.075 of B and experiments 10 through 13 contain 0.50 millimole of Al, 0.005 millimole of Ni and 0.075 millimole of B.

| Exp. No. | $R_aAlX_b$ | Polymer yield, wt. g. | DSV | IR analysis, percent | | |
|---|---|---|---|---|---|---|
| | | | | Cis | Trans | 1,2 |
| 1 | DEAF | 9.5 | 2.4 | 97.0 | 1.5 | 1.5 |
| 2 | DEAC | 0.5 | Liquid | 87.0 | 11 | 2 |
| 3 | EASC | .3 | Liquid | Not analyzed | | 2 |
| 4 | EADC | .5 | Liquid | Not analyzed | | |
| 5 | DEAI | 0 | | | | |
| 6 | DEAF | 8.8 | 2.7 | 96.6 | 1.3 | 2.1 |
| 7 | DEAC | 5.0 | 0.17 | 77.5 | 20.0 | 2.5 |
| 8 | EASC | 5.7 | 0.21 | 86.6 | 10.2 | 3.2 |
| 9 | EADC | 6.2 | 0.22 | 87.0 | 9.7 | 3.3 |
| 10 | DEAF | 0 | | | | |
| 11 | DEAC | 5.6 | Liquid | Not anaylzed | | |
| 12 | EASC | 8.0 | Liquid | Not anaylzed | | |
| 13 | DEAI | 6.3 | 0.14 | 40.7 | 56.5 | 2.8 |

DEAF—diethylaluminum fluoride $(C_2H_5)_2AlF$. DEAC—diethylaluminum chloride $(C_2H_5)_2AlCl$. EASC—ethylaluminum sesquichloride $(C_2H_5)_{1.5}AlCl_{1.5}$. EADC—ethylaluminum dichloride $C_2H_5AlCl_2$. DEAI—diethylaluminum iodide $(C_2H_5)_2AlI$.

Although the cis 1,4 contents of these polymers ranged between 40 and 97%, the total 1,4 polybutadiene contents were 97–98% and the 1,2 polybutadiene was only 2–3% in all instances, regardless of the halide catalyst used. The proportion of cis- and trans-isomers depended upon which halide was used as a catalyst.

Example 3

The preparation of high cis-1,4 polybutadiene was effected over a wide range of catalyst concentrations.

The following data show results obtained while varying the total catalyst charge in nine different experiments between 0.15 and 0.98 part by weight per hundred parts of monomer. The polymerizations were conducted at $50°$ C. for 18 to 23 hours in a manner similar to that described in Example 1.

| Catalyst, millimoles/10g. bd. | | | Total catalyst, phm. | Polymer yield, Wt. g. | DSV |
|---|---|---|---|---|---|
| DEAF | Ni octanoate | $BF_3 \cdot Et_2O$ | | | |
| 0.08 | 0.004 | 0.05 | 0.17 | 9.2 | 2.24 |
| .06 | .005 | .05 | .15 | 9.4 | 2.18 |
| .25 | .005 | .075 | .39 | 2.0 | |
| .25 | .005 | .15 | .49 | 5.5 | 3.69 |
| .25 | .010 | .15 | .51 | 9.4 | 1.79 |
| .25 | .005 | .30 | .70 | 5.8 | 3.61 |
| .50 | .010 | .15 | .77 | 3.5 | |
| .50 | .005 | .30 | .96 | 1.3 | |
| .50 | .010 | .30 | .98 | 8.3 | 3.19 |

Example 4

Good yields of high cis 1,4 polybutadiene have been produced over a wide range of catalyst mole ratios. The following data show results obtained while the mole ratio of DEAF to $BF_3 \cdot Et_2O$ ranged between 0.4 and 6.67. The Al/Ni mole ratio ranged between 6 and 100. The polymerizations were effected at $50°$ C. in a manner similar to that described in Example 1 except that 0.005 millimole of nickel octanoate and 0.075 millimole of boron trifluoride diethyl etherate were employed per 10 grams of butadiene and the diethyl aluminum fluoride was employed as indicated in the table below in millimoles per 10 grams of butadiene. Several series of bottles were charged identically and then polymerizations were stopped at the indicated time intervals by charging one part per hundred of monomer of both triisopropanolamine and 2,6-ditertiarybutyl para-cresol.

| Exp. No. | DEAF | Yield, grams at hours | | | | DSV |
|---|---|---|---|---|---|---|
| | | 1 | 2 | 4 | 18 | |
| 1 | .030 | 0.8 | 2.6 | 5.7 | 8.9 | 1.75 |
| 2 | .045 | 1.8 | 4.9 | 7.8 | 9.8 | 2.11 |
| 3 | .060 | 2.6 | 6.4 | 8.6 | 9.6 | 2.22 |
| 4 | .080 | 3.4 | 6.7 | 8.8 | 9.4 | 2.25 |
| 5 | .10 | 3.1 | 6.4 | 8.5 | | 2.20 |
| 6 | .15 | 0.8 | 1.9 | 4.8 | 8.7 | 2.17 |
| | .25 | | | | 2.0 | |
| | .50 | | | | .04 | |

As illustrated in experiments Nos. 7 and 8, polymerization is retarded at high ratios of DEAF to $BF_3 \cdot Et_2O$. Virtually no polymerization occurred at mole ratios of DEAF/$BF_3 \cdot Et_2O$=6.67.

Example 5

Boron trifluoride complexes other than $BF_3 \cdot$diethyl etherate have been used in conjunction with DEAF and nickel salts to produce high cis-1,4 polybutadiene. $BF_3 \cdot$dibutyl etherate is preferred slightly since it polymerizes butadiene at a greater rate than the $BF_3 \cdot$diethyl etherate does. On the other hand, $BF_3 \cdot$alcoholates and $BF_3 \cdot$phenolate are less effective as catalysts in conjunction with DEAF than $BF_3 \cdot$diethyl etherate is. The polymerizations were effected in a manner similar to that described in Example 1 except that the millimole of nickel octanoate and of the particular $BF_3$ complex were 0.005 and 0.075 respectively. The particular complex of boron trifluoride employed is set forth in column 3 and the amount of DEAF is set forth in column 2 as millimoles per 10 grams of butadiene.

| Exp. No. | DEAF | $BF_3$ complex | Yield, grams at hours | | | | DSV |
|---|---|---|---|---|---|---|---|
| | | | 1 | 2 | 4 | 18 | |
| 1 | 0.08 | $Et_2O$ | 3.4 | 6.7 | 8.8 | 9.4 | 2.25 |
| 2 | .08 | $Bu_2O$ | 5.7 | 8.5 | 9.7 | 10.0 | 2.50 |
| 3 | .08 | EtOH | 0.6 | 0.8 | 5.9 | 10.1 | 2.80 |
| 4 | .06 | 2 phenol | 0.1 | 0.4 | 0.5 | 7.7 | 2.25 |
| 5 | .15 | do | 0.1 | 0.6 | 2.1 | 8.5 | 3.1 |

Example 6

A purified butadiene-hexane premix containing 9 grams of butadiene per 100 cc. was charged to 4-ounce bottles and the polymerization was effected in a manner similar to that described in Example 1 except that in the first six experiments the amount of nickel octanoate was 0.0055 millimole per 10 grams of butadiene, in the seventh it was 0.011 and in all seven experiments 0.083 millimole of $BF_3Et_2O$ was employed per 10 grams of butadiene. The amount of DEAF is set forth in column 2 in millimoles per 10 grams of butadiene.

| Exp. No. | DEAF | Polymerization time, hrs. | Polymer yield, wt. percent | DSV |
|---|---|---|---|---|
| 1 | 0.067 | 2 | 71 | 3.24 |
| 2 | .067 | 4 | 90 | |
| 3 | .067 | 21 | 97 | 3.11 |
| 4 | .089 | 21 | 99 | 3.28 |
| 5 | .111 | 4 | 76 | |
| 6 | .111 | 21 | 94 | 3.30 |
| 7 | .111 | 2 | 76 | 3.23 |

This example illustrates the use of an aliphatic solvent, hexane, to produce a high cis 1,4 polybutadiene which is believed to be unique.

Example 7

This experiment shows that nickel appears to be an essential element in the combination of alkyl aluminum fluoride and $BF_3$ or $BF_3$ complexes in order to effect satisfactory polymerization of butadiene to either a high yield or high cis 1,4 content. When cobalt octanoate was used instead of nickel octanoate under conditions otherwise identical to those described in Example 1 except that 0.6 DEAF, 0.05 metal octanoate and 0.75 boron trifluoride ehtyl etherate being employed, a low yield of moderately high cis 1,4 polybutadiene (84.2 compared to 97.0) was obtained by the use of cobalt. In experiment No. 1 nickel octanoate was employed and in experiment No. 2 cobalt octanoate was employed.

| Exp. No. | Polymer yield, wt. percent | IR analysis, wt. percent | | |
|---|---|---|---|---|
| | | Cis | Trans | 1,2- |
| 1 | 95 | 97.0 | 1.5 | 1.5 |
| 2 | 21 | 84.2 | 3.2 | 12.6 |

The cobalt catalyst produced polymer analyzing only 84% cis 1,4 polybutadiene. Furthermore, the cobalt catalyst did not have a strong stereoregulating ability to produce a high total 1,4 polybutadiene since the polymer contained almost 13 percent 1,2-polybutadiene. This is in contrast to the nickel catalyst as shown in experiment 2.

Example 8

An amount of polymer sufficiently large to permit obtaining some physical properties was prepared. In this experiment, 26,100 grams of purified premix solution containing 11.0% by weight of butadiene in benzene was charged to a 10 gallon reactor. The reactor contents were heated to 50° C. The catalysts were injected separately in the following order: (1) 46 cc. of 0.50 molar DEAF, (2) 26 cc. of 0.05 molar Ni octanoate and (3) 29 cc. of 0.50 molar $BF_3 \cdot Et_2O$.

The course of the polymerization was followed by periodically taking samples. These samples indicated 7.3, 24.5, 56.4 and 82.9 weight percent conversion of butadiene to polymer after 1, 2, 4 and 8 hours, respectively. The polymerization was stopped after 8 hours by charging 23.9 grams of crude abietic acid and 23.9 grams of 2,6-ditertiarybutyl-para-cresol. The weight of dried polymer recovered was 2345 grams or 81.7 weight percent of the butadiene charged.

The dried polymer was a clear, light yellow (from the stopping agent), tacky elastomer. It had a DSV of 2.34 and a Mooney viscosity (ML–4) of 29. It contained no extractables, as determined by treating for 30 hours with a hexane-isopropanol solution, after correcting for the amount of stopping and anti-oxidant agents present.

The polymer was compounded using a standard test formula for tread stock. Some of the properties that it exhibited are as follows:

| | | |
|---|---|---|
| Modulus (300%) | p.s.i. | 930 |
| Tensile strength | p.s.i. | 2620 |
| Elongation | percent | 600 |
| Hot tensile | p.s.i. | 1300 |
| Tear (Instron) | lb./in. | 281 |
| Dynamic modulus | d./sq.c. | 81 |
| Internal friction | k.p. | 26.7 |
| Cold rebound | percent | 66 |
| Hot rebound | do | 75 |
| Resilience | | 45 |

These data indicate the process of this invention produces cis 1,4 polybutadiene of very good quality.

While certain representative embodiments and details have been shown for the purpose of illustrating the invention, it will be apparent to those skilled in this art that various changes and modifications may be made therein without departing from the spirit or scope of the invention.

What is claimed is:

1. A process for the polymerization of butadiene and butadiene in mixture with other diolefins to form polymers containing a high proportion of the butadiene units in the cis-1,4 configuration comprising contacting at least one such diolefin under polymerization conditions with a catalyst comprising (1) at least one organo aluminum fluoride, (2) at least one organo nickel compound selected from the group consisting of nickel salts of carboxylic acids, organic complex-compounds of nickel and nickel tetracarbonyl and (3) at least one boron compound selected from the group consisting of boron trifluoride and the stable complexes of boron trifluoride.

2. A process according to claim 1 in which the diolefin is butadiene 1,3.

3. The process according to claim 1 in which the organo nickel compound is selected from the group consisting of nickel salts of carboxylic acids and organic complex compounds of nickel.

4. A process according to claim 1 in which the organo aluminum fluoride is diethyl aluminum fluoride.

5. A process according to claim 1 in which the boron compound is a boron trifluoride etherate.

6. A process according to claim 1 in which the polymerization is carried out in an aliphatic solvent.

7. A process according to claim 1 in which the mole ratio of Al/B ranges from about 0.4/1 to about 2/1, the mole ratio of Al/Ni ranges from about 2/1 to about 60/1 and the mole ratio of B/Ni ranges from about 2/1 to about 60/1.

8. The process according to claim 7 in which the organo aluminum fluoride is diethyl aluminum fluoride, the organo nickel compound is nickel octanoate and the boron compound is a boron trifluoride dibutyl etherate.

9. A catalyst composition comprising (1) at least one organo aluminum fluoride, (2) at least one organo nickel compound selected from the group consisting of nickel salts of carboxylic acids, organic complex-compounds of nickel and nickel tetracarbonyl and (3) at least one boron compound selected from the group of boron trifluoride and the stable complexes of boron trifluoride.

10. A catalyst composition according to claim 9 in which the mole ratio of Al/B ranges from about 0.4/1 to about 2/1; the mole ratio of Al/Ni ranges from about 2/1 to about 60/1 and the mole ratio of B/Ni ranges from about 2/1 to about 60/1.

References Cited

UNITED STATES PATENTS

| | | | |
|---|---|---|---|
| 3,170,905 | 2/1965 | Ueda et al. | 260—94.3 |
| 3,170,907 | 2/1965 | Ueda et al. | 260—94.3 |

JOSEPH L. SCHOFER, *Primary Examiner.*

R. A. GAITHER, *Assistant Examiner.*

U.S. Cl. X.R.

252—429; 260—82.1